Oct. 11, 1938.    C. J. HOLSLAG    2,132,479
AUTOMATIC ARC WELDING SYSTEM
Filed Dec. 22, 1936    2 Sheets-Sheet 1
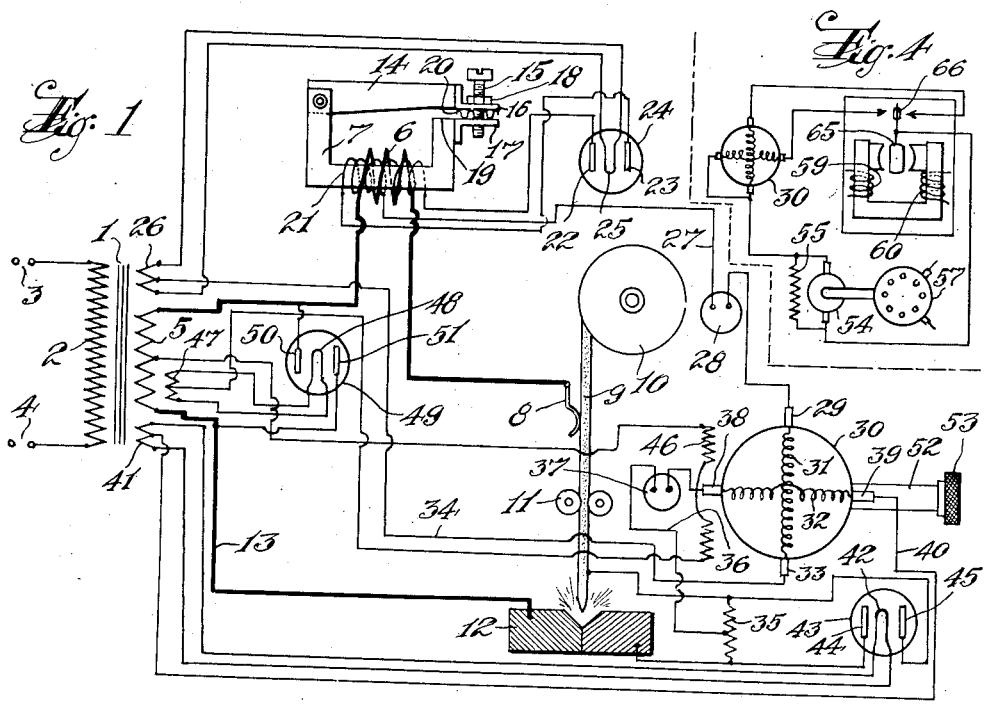
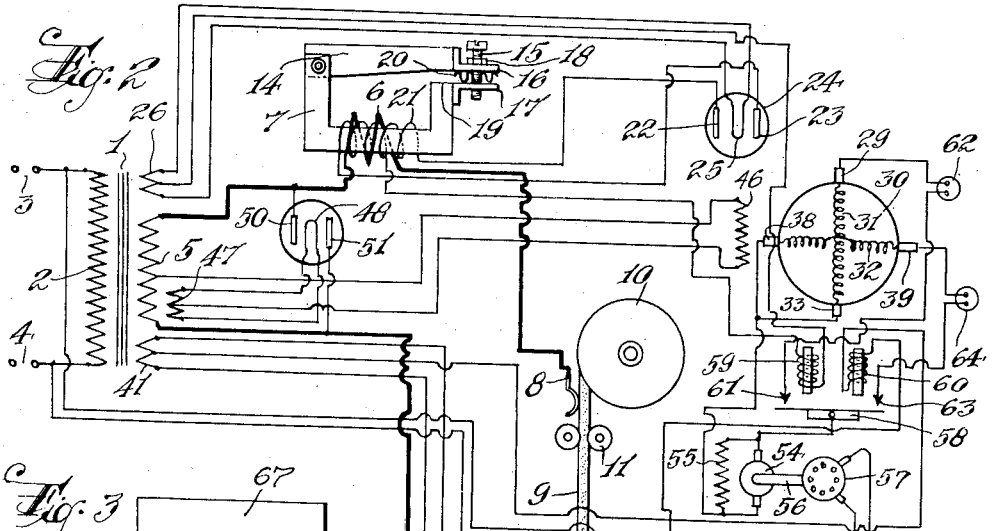
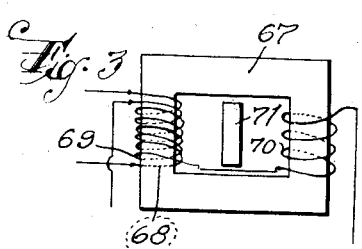
INVENTOR
Claude J. Holslag
BY
A. D. T. Libby
ATTORNEY Oct. 11, 1938.  C. J. HOLSLAG  2,132,479
AUTOMATIC ARC WELDING SYSTEM
Filed Dec. 22, 1936   2 Sheets-Sheet 2

INVENTOR
Claude J. Holslag
BY
A. D. T. Libby
ATTORNEY

Patented Oct. 11, 1938

2,132,479

UNITED STATES PATENT OFFICE 2,132,479

AUTOMATIC ARC WELDING SYSTEM

Claude J. Holslag, South Orange, N. J., assignor to Electric Arc Cutting & Welding Company, Newark, N. J., Application December 22, 1936, Serial No. 117,160

6 Claims. (Cl. 219—8)

This invention relates to an automatic arc welding system in which a metallic electrode is fed to the work which comprises one of the electrodes, in accordance with the character of the work to be performed.

I am aware that numerous systems of automatic machine arc welding have been proposed, but I have found these to be more or less complicated and sluggish, and not entirely satisfactory in operation.

It is the principal object of my invention to provide a simplified yet more efficient automatic welding system. I have found, after many tests, that alternating current, when properly controlled, gives better results in automatic machine welding than direct current, especially where large currents are used. By utilizing the submerged arc system shown and described in my Patent 2,105,079, issued January 11, 1938, with my present control system, I have obtained most excellent results that are much superior to those obtained by the use of direct current, and at a much less initial cost of apparatus and maintenance.

These and other advantages will appear to one skilled in the art by reading the specification, taken in connection with the annexed drawings, wherein:

Figure 1 is a diagrammatic circuit of one form of my improved welding system.

Figure 2 is a view similar to Figure 1, but showing certain modifications therein.

Figure 3 is a diagrammatic illustration of a form of transformer which may be used in place of the source of power shown in Figures 1 and 2.

Figure 4 is a diagrammatic view of a modified form of certain of the details used in my system.

Figure 5:
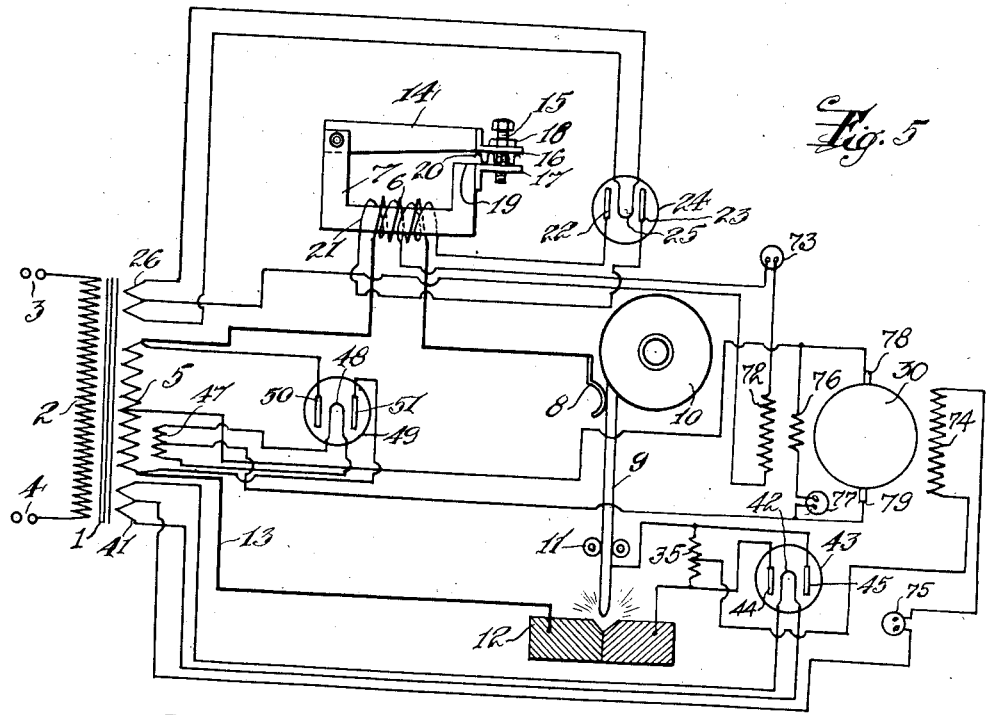
Figure 5 is a modified form of Figure 1 or vice versa.

In Figure 1, 1 is a transformer core having a primary winding 2 connected to switch contacts 3 and 4. One end of one of the secondary windings 5 is connected to a winding 6 on a reactor 7. The other end of the winding 6 is connected in any satisfactory manner, a sliding shoe 8 being indicated, to a continuous wire or electrode 9 which is normally wound on a reel 10. The electrode 9 passes through one or more sets of feed rolls 11 into arc-welding engagement with the work-piece 12 on which the welding operation is to be performed. The work 12 is connected by a conductor 13 to the other end of the winding 5. The reactor 7 is provided with an adjustable yoke 14, the adjustment being made by an adjustment screw 15 which passes through brackets 16 and 17 and is locked in position by a lock-nut 18. In order to prevent the yoke 14 from coming into contact with the pole 19 of the reactor, I provide a separator 20 between the brackets 16 and 17. The separator 20 may be in the form of a corrugated spring which will allow the necessary adjustment to be made, at the same time preventing the reactor from setting up undue vibrations when the welding currents pass therethrough.

The reactor 7 carries another winding 21, the terminals of which are connected to the plates 22 and 23 of a tube rectifier 24, the filament 25 of which is connected to a filament supply winding 26 on the transformer 1. The central point of the winding 21 is connected by a conductor 27 to a rheostat 28 which, in turn, is connected to a brush 29 of a direct current motor 30. The motor 30 has two windings 31 and 32 thereon, the function of which will be later described. The opposite end of the winding 31 is connected through a brush 33 and conductor 34 to the central point of the winding 26, although it may be connected to either terminal of the filament 25.

Connected directly across the arc formed at the junction of the electrodes, is an impedance 35, the central point of which is connected by a conductor 36 to a rheostat 37, and this in turn to a brush 38 connected to one end of the winding 32, the opposite end of which is connected by a brush 39 and conductor 40 to the central point of a winding 41 which is connected to a filament 42 on a rectifier tube 43 similar to 24. The plates 44 and 45 of the rectifier 43 are connected to the terminals of the impedance 35. One end of the field 46 of the motor 30 is connected to the center of the winding 5, while the other end of the field winding 46 is connected to the center of the winding 47, connected to the filament 48 of a rectifier tube 49, the plates 50 and 51 of which are connected across the winding 5.

The motor 30 may have a shaft extension 52 and a knob 53 thereon for manually adjusting the motor 30, if necessary.

The operation of the circuit of Figure 1, is substantially as follows:

When the current is applied from the switch contacts 3 and 4 to the transformer 1, and assuming that the electrode 9 is in engagement with the contact shoe 8, a voltage is applied across the arc contacts and across the impedance 35. The rectifier 43 will at once supply direct current to the winding 32 of the motor 30, it being understood that the rectifier 49 applies direct current to the field winding 46, and the motor 30 will immediately start, causing the feed rolls 11 to rapidly feed the electrode 9 downwardly into engagement with the work electrode 12. Immediately the electrodes come in contact, the voltage across the impedance 35 disappears and, due to the heavy current which will then flow through the reactor winding 6, a voltage will build up immediately in the winding 21, which will be rectified by the rectifier 24 and applied to the winding 31. The motor will immediately reverse and pull the electrode 9 away from the work 12, and the arc voltage will start, and the two voltages, adjustable by the rheostats 28 and 37 in accordance with the work being performed, will automatically work out a slight difference value between the two, which will maintain the arc steady, and continuously feed the electrode 9, in accordance with the adjustments made for the work to be performed when the welding operation is started.

In Figure 2, the control on the motor 30 is somewhat different from that shown in Figure 1. In this figure, the current for the windings 31 and 32 is supplied by a small direct current generator 54 having a field winding 55 and connected, through a shaft 56 or other equivalent means, to a motor 57, an induction motor being indicated. One terminal of the generator 54 is connected to an armature 58 of a relay having two windings, one winding, 59, of which is connected to the central part of the winding 21, while the other winding, 60, of the relay is connected to the central point of the impedance 35. One contact 61, controlled by the winding 59, is connected through a rheostat 62 to the brush 29 of the winding 31, while the contact 63, controlled by the winding 60, is connected through a rheostat 64 to the brush 39 of the winding 32. In this arrangement, the relay having the windings 59 and 60 is more sensitive than the windings 31 and 32 on the motor 30, and will therefore respond to smaller changes in the arc voltage, and for that reason, on some classes of work, where more sensitive control is used, this arrangement may be found more useful.

A further sensitive control is shown in Figure 4, wherein the windings 59 and 60 are disposed as the field of an instrument similar to a voltmeter, wherein the moving element 65 carries a contact 66 which is adapted to take current from the generator 54 and pass it to the windings 31 and 32 of the said motor 30, in accordance with the changes in the two balancing voltages heretofore described. The instrument carrying the windings 59 and 60 may readily be of such a character that the moving element 65 will be operated when alternating or fluctuating current is connected to the windings 59 and 60, so that these windings may be connected respectively to the winding 21 on the reactor 7, and to the impedance 35 or across the arc electrodes themselves, without the use of the rectifiers 24 and 43.

In Figure 3, I have illustrated a transformer such as shown and described in my Reissue Patent 16,012, which transformer has a core 67, a primary winding 68, a main secondary 69, and an auxiliary secondary 70 connected in series therewith, and a flux diverter 71, the arrangement being such as to give constant energy characteristics which I have found preferable for use in my improved welding system. In using a transformer of this kind, it is to be understood that the core will be provided with all the other necessary windings, such as 26, 41 and 47, in addition to those shown. It is also to be noted that a transformer such as shown in my Patent 1,305,363, may be used with good results.

In Figure 5, I have shown what might be termed a modification of Figure 1, or vice versa. In this figure, the motor 30 has a plurality of field windings, one of which, 72, has one end connected through a rheostat 73 to the central point of the winding 21 on the reactor 27, while the other end of the winding 72 is connected to the central tap on the winding 26, so that the winding 72 gets a direct current from the rectifier 24. Another field winding 74 has one end connected through a rheostat 75 to the central tap in the winding 41, while the other terminal of the winding 74 is connected to a central tap on the impedance 35, so that rectified current is applied to the winding 74 by the rectifier 43. A third field winding 76, having preferably about one-half the exciting value as the other windings 72 and 74, is connected through a rheostat 77 across the motor armature brushes 78 and 79, said brushes being connected to the rectifier 49 as indicated.

The armature of the motor 30 preferably has sufficient reactance so that no undue current flows from the rectifier 49 therethrough when the armature of the motor 30 is not turning. The action of the motor 30 in this case is approximately the same as in Figure 1; that is to say, when the electrode 9 is in the position as indicated and it is desired to start the arc, a voltage will be present across the arc electrodes, and the impedance 35 and rectified current will be applied to the field winding 74, thereby energizing the field sufficiently with the winding 76 as to cause the motor armature to turn to run the electrode 9 down into contact with the workpiece 12. As soon as this contact is made, the voltage across the impedance 35 disappears and heavy current flows through the winding 6 in the reactor 7, causing a voltage to be built up across the winding 72 of the motor. This, with the winding 76, will cause the motor to reverse to pull the electrode 9 away from the work 12, to start the arc, and immediately the arc is started, the two voltages will then come into operation, tending to balance each other and cause the motor to feed the electrode 9 as required.

Figure 6:
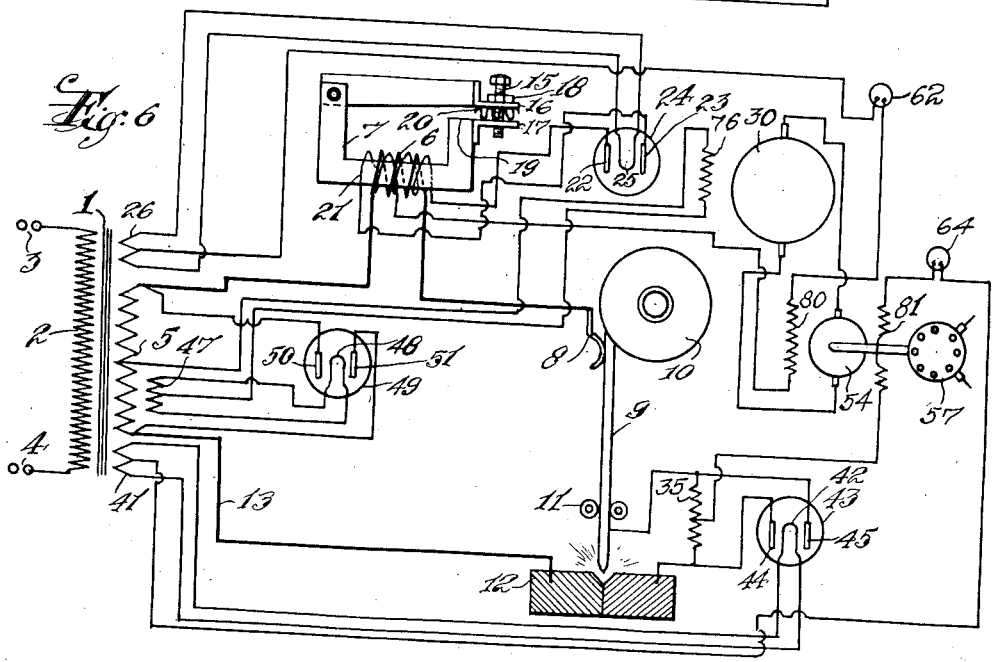
Figure 6 is a modified form of Figure 2.

In Figure 6, the motor 30 has a full-strength field winding 76, but the armature is fed from a generator 54 driven by any satisfactory means, as by an induction motor 57, as in Figure 2. However, in Figure 6, the generator 54 has two field windings 80 and 81, the winding 80 being supplied with current through a rheostat 62 by the rectifier 24, while the winding 81 is supplied with current through a rheostat 64 by the rectifier 43.

The operation of the motor 30 will be obvious without further description. If desired, a relay may be used in the output circuit of the generator 54 to apply the current to the motor 30. Also, a relay or relays may be used to apply current to the windings 72 and 74 of the arrangement shown in Figure 5.

While I have shown, in Figures 1, 2, 5 and 6, a reactance voltage taken from the winding 21, I may use some other source, or a fixed voltage in what I term a balanced control, but I have found that the reactance voltage as shown gives a maximum speed of control of the electrode with an automatic slowing down to the desired arc length.

From what has been said, it will be understood that the A. C. arc voltage may be balanced by a reactance voltage, or a fixed A. C. or D. C. voltage, and the arc voltage may be balanced against any one of the previously mentioned voltages directly applied, or through intermediate control devices in the form of relays. While I prefer to use alternating current in my system, the invention is applicable to a direct current arc welding system.

The advantages herein enumerated will be clear to one skilled in this art, from the fact that the reactance voltage is absent when the arc voltage is a maximum, and the arc voltage is absent when the reactance voltage is a maximum, and both are reduced to the balancing value in a minimum length of time with practically no over-running or under-running. By using the rheostats in the circuits of the motor 30, this speed control can be adjusted in either or both circuits.

It may be noted, in passing, that I have found, in automatic machine welding, that the arc is actually better in its characteristics if the electrode is slightly oscillated, as this tends to prevent the molten globules from the electrode from flying off, as they sometimes do, where the electrode is held perfectly stationary, and my arrangement of operating the arc by balanced voltages gives a slight oscillation which I have found advantageous.

While I have shown different ways of applying current to the feed motor 30, other control devices, such as a radio beam relay, may be used where super-sensitivity is essential or necessary. Also, while I have shown a bare electrode 9, a partially flux-coated electrode, or an electrode as shown in my Patent 1,371,094, of March 8, 1921, may be used; or, as stated earlier in the specification, a submerged arc may be used.

In the claims, where I refer to an electro-magnetic device having two or a plurality of windings, this is intended to include the feed motor having either two armature windings and a field winding, or a single armature winding with two field windings as in Figure 5; or a combination as described in Figure 6; or the indirect arrangement of relay control where, in some cases, the relay may be of a rotatable type. Stated in another way, the generator 54 of Figure 6 may be considered as a rotatable relay, or the device of Figure 4 may be likewise so considered. Thus, the mechanical devices for carrying my invention into practice may take various forms, without departing from the spirit of my invention or the scope of the appended claims; for example, where a hand tool is used for light work, a pneumatic motor may be used, controlled by a relay; or a pneumatic motor may be used in place of the direct current motor, even in the larger sizes of automatic welding machines.

What I claim is:

1. In an automatic arc welding system, a source of welding current, means for feeding an electrode to the work to be welded comprising the other electrode, the electrodes being connected to said source of welding current, means for controlling the feed of the welding electrode in relation to the work, said feed-controlling means including an electro-magnetic device having two windings, one winding being energized by a voltage derived exclusively from across the arc, while the other winding is energized by a cooperative balancing voltage derived from said source of welding current but distinct from the current through the arc.

2. In an automatic arc welding system utilizing alternating current as a source of supply for the arc, means for feeding an electrode to the work to be welded comprising the other electrode, the electrodes being connected to said source of welding current, means for controlling the feed of the welding electrode in relation to the work, said feed-controlling means including an electromagnetic device having a double winding, one winding being energized by a rectified voltage taken from across the arc, while the other winding is energized not by the current through the arc, but by a rectified voltage taken from a part of the welding circuit having considerable reactance.

3. In an automatic arc welding system utilizing for the arc, alternating current having constant energy characteristics, means including a single direct current motor having two armature windings on the same core and disposed to produce reverse direction of rotation of the motor, for feeding the electrode to the work comprising the other electrode, the electrodes being connected to said source of welding current, and means for feeding direct current to said motor windings in accordance with the difference between a voltage derived directly and continuously from across the arc, and a voltage derived from some other relatively fixed source of current, preferably from the alternating current source of welding current itself.

4. In an automatic alternating current arc welding system, means for controlling the relative arc relationship between the arc electrodes, said means including a single motor having a double-wound armature and an electromagnetic device having windings and contacts for directing current at different times through said motor armature windings, one of said device windings being energized by a voltage derived from directly across the arc, while another of said device windings is energized by a voltage derived from a winding inductively energized by the flow of current in the arc circuit.

5. In an automatic arc welding system utilizing alternating current as a source of current supply for the arc, means for feeding an electrode to the work to be welded comprising the other electrode, said electrodes being connected to said source of welding current, means for controlling the feed of the electrode to the work, said feed-controlling means including a dynamo-electric machine having two armature windings on the same core and a field winding uniformly excited, one of the armature windings being energized by a voltage derived exclusively from across the arc, while the other armature winding is energized by a voltage inductively derived from a different part of the welding circuit, the two balancing voltages being so related that each is absent when the other is a maximum, to give maximum speed control on the movement of the electrode.

6. In an automatic arc welding system, a source of arc welding current, means including a single direct current motor having a single field winding steadily and uniformly excited and two armature windings on the same core and disposed to directly produce reverse direction of rotation of the motor for controlling the feed of an electrode to the work comprising the other electrode, said electrodes being connected to said source of welding current, and means for feeding direct current to said armature windings by voltages having a balancing relation, said voltages being taken from different parts of the arc welding circuit, one voltage being derived exclusively from directly across the arc, while the other voltage is derived from a source controlled by the flow of arc current.

CLAUDE J. HOLSLAG.